US012583250B1

(12) United States Patent
Hoplin

(10) Patent No.: US 12,583,250 B1
(45) Date of Patent: Mar. 24, 2026

(54) WEIGHTED CHALK LINE DEVICE

(71) Applicant: Bret Hoplin, Powhatan, VA (US)

(72) Inventor: Bret Hoplin, Powhatan, VA (US)

( * ) Notice: Subject to any disclaimer, the term of this patent is extended or adjusted under 35 U.S.C. 154(b) by 403 days.

(21) Appl. No.: 18/482,087

(22) Filed: Oct. 6, 2023

Related U.S. Application Data

(60) Provisional application No. 63/414,634, filed on Oct. 10, 2022.

(51) Int. Cl.
*B44D 3/38* (2006.01)

(52) U.S. Cl.
CPC .................................... *B44D 3/38* (2013.01)

(58) Field of Classification Search
CPC ...................................................... B44D 3/38
USPC .................................................. 33/413, 414
See application file for complete search history.

(56) References Cited

U.S. PATENT DOCUMENTS 2,655,728 A 10/1953 Cook
3,036,791 A 5/1962 Siggelkow
5,699,622 A 12/1997 Umbro
7,269,907 B2 * 9/2007 Levine ................ G01C 15/004 33/286
7,681,826 B2 * 3/2010 Whitney .................. B44D 3/38 242/395.1
RE41,620 E 9/2010 Scillia et al.
8,402,671 B1 3/2013 Marhold
9,636,752 B2 * 5/2017 Adkin ...................... B25H 7/02
9,757,977 B2 9/2017 DeLeo et al.
9,802,441 B2 * 10/2017 Douglas ................... B44D 3/38
12,391,064 B1 * 8/2025 Calvert .................... B44D 3/38
2005/0283987 A1 * 12/2005 Nash ................... G01C 15/004 33/286
2008/0141549 A1 6/2008 Brown
2008/0282563 A1 11/2008 Cruz et al.
2022/0307835 A1 * 9/2022 Basile ................. G01C 15/008

* cited by examiner

*Primary Examiner* — George B Bennett
(74) *Attorney, Agent, or Firm* — John Rizvi; John Rizvi, P.A.—The Patent Professor®

(57) ABSTRACT

A weighted chalk line device may include a main body. A plurality of angular markings may be arranged on a top side of the main body at angularly-spaced-apart intervals about a central point, and may provide a visible indication of a respective plurality of angular positions about the central point. A bottom side of the main body may stably rest on a flat surface, and a first end of the string may be secured to the main body. The weight of the weighted chalk line device may maintain the first end of the string in a fixed position relative to the flat surface. The string may extend from the main body in taut condition and radially outward from the central point, and may be aligned with a selected angular marking providing a visible indication of the angular position of the string about the central point.

20 Claims, 9 Drawing Sheets

WEIGHTED CHALK LINE DEVICE

CROSS-REFERENCE TO RELATED APPLICATION

This application claims the benefit of U.S. Provisional Patent Application No. 63/414,634, filed on Oct. 10, 2022, which is incorporated herein in its entirety.

FIELD OF THE INVENTION

The present invention relates generally to a construction device, and more particularly, to a weighted chalk line device.

BACKGROUND OF THE INVENTION

A chalk line box or tool is used for marking long, straight lines on relatively flat surfaces, much farther than is practical by hand or with a straightedge. A chalk line box or tool may be used to lay out straight lines between two points, or vertical lines. A chalk line tool is used to draw straight lines by the action of a taut nylon or similar string that has been previously coated with a loose dye, usually chalk. The string is then laid across the surface to be marked and pulled tight. Next, the string is then plucked or snapped sharply, causing the string to strike the surface along a straight line, which then transfers its chalk to the surface along that straight line where it struck. Chalk lines are typically used to mark relatively flat surfaces. However, as long as the line is taut and the two ends of the chalk line are in nearly the same plane, the chalk line will mark all points that the string touches on or near that plane once snapped. The objects to be marked do not need to be continuous along the line. Chalk lines can also be used across irregular surfaces and surfaces with holes in them, for example on an unfinished stud wall.

A conventional telescopic chalk line device is related to a telescopic rod in combination with a chalk line device embodying a spring-actuated reel for coiling up the line following any given use thereof. The free end of the line, which line may be any type of cord customarily employed for chalk line purposes, is secured at the freely extensible end of the telescopic rod, so that extension of the rod over any given distance will automatically accomplish a paying out of a corresponding length of chalk line from the reel, and will hold it in properly extended, taut condition for plucking by the person holding the device against the surface concerned. Chalking of the line is accomplished in any suitable and well-known manner, preferably by the customary expedient of packing chalk dust about the reel, or of holding a stick of chalk against the line as it is being paid out.

A conventional measuring assistance device is related to a device comprising a body, having a cavity extending therethrough from a top surface to a bottom surface. The device may comprise a massive core enclosed by a cover. A recessed area on the top surface adjacent to the cavity extends from the cavity to a perimeter of the body. A designated edge between the cavity and the recessed area is located a predetermined distance from an opposite perimeter. A releasable fastener or clamping device may be provided at the recessed area. A top and bottom post may be coupled together in a center hole in the body, to provide a center post from which to measure. Markings may be provided on the top surface of the body for measuring at an angle from the center. Small grooves may be provided in side surfaces of the body for aligning the device with lines or markings on the floor.

A conventional measuring tape with a slotted end flange for guiding a tool tip is related to a measuring tape apparatus that includes a housing, and a tape disposed in the housing and having measuring indicia thereon. The tape has a first end inside of the housing, and a free end which is slidably removable from the housing. An L-shaped end flange is attached to the free end of the tape, for use in aligning the tape with a work piece. The end flange includes a connection section which is oriented substantially parallel to the tape, and an alignment section, substantially perpendicular to the connection section, for contacting an edge portion of a work piece. Rivets are provided to connect the end flange to the tape. The connection section also has a slot formed therein, extending laterally across the flange. The slot is adapted to receive a tip portion of a knife or marking implement therethrough and may have a side edge which is substantially parallel to the alignment section.

A conventional tape or a chalk line with a magnetic holder is related to a tape or chalk line or any other elongate analogous device or instrument with an easily used holding device enabling the chalk line, tape or the like to be used by one person, whereas it would ordinarily require two people to perform a number of operations with tapes or lines.

However, there remains a need in the art for a solution to at least one of problem associated to conventional chalk line devices, related to the fact that a conventional chalk line device usually cannot be used by a single user while needing two people to lay out a chalk line.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention is directed to a weighted chalk line device for drawing chalk lines. A user may hook or tie a string on the weighted chalk line device while moving the string at any angle and in any direction. The weighted chalk line device may allow a single person to lay out a chalk line.

The weighted chalk line device may comprise a main body, a first through hole, a second through hole, a third through hole, an indentation, an anchor, a first cross groove, a second cross groove, a third cross groove, a fourth cross groove, a linear groove, and a plurality of markings. The main body may comprise a top surface, a bottom surface, a first lateral surface, a second lateral surface, a third lateral surface, a fourth lateral surface, and a center bar. The first through hole, the second through hole, and the third through hole may traverse through the main body from the top surface to the bottom surface. The first cross groove, the second cross groove, the third cross groove, and the fourth cross groove may traverse into the first lateral surface, the second lateral surface, the third lateral surface, and the fourth lateral surface respectively. The indentation and the linear groove may traverse into the bottom surface. The center bar may be formed between the second through hole and the third through hole. The anchor may be mounted on the center bar. The plurality of markings may be distributed over the top surface around the second through hole and the third through hole and on the center bar.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

These and other objects, features, and advantages of the present invention will become more readily apparent from the attached drawings and the detailed description of the preferred embodiments, which follow.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

The preferred embodiments of the invention will hereinafter be described in conjunction with the appended drawings provided to illustrate and not to limit the invention, where like designations denote like elements, and in which:

Figure 1:
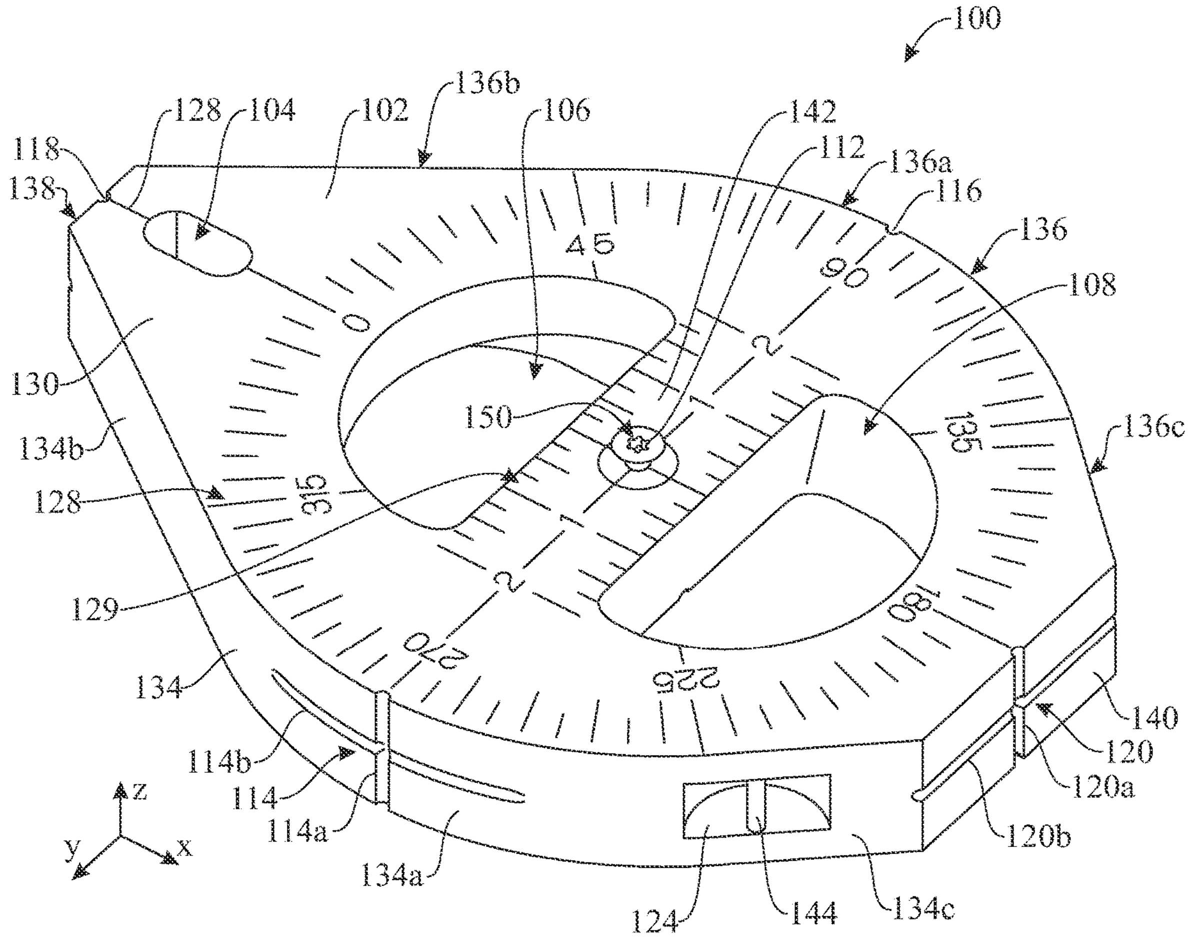
Figure 2:
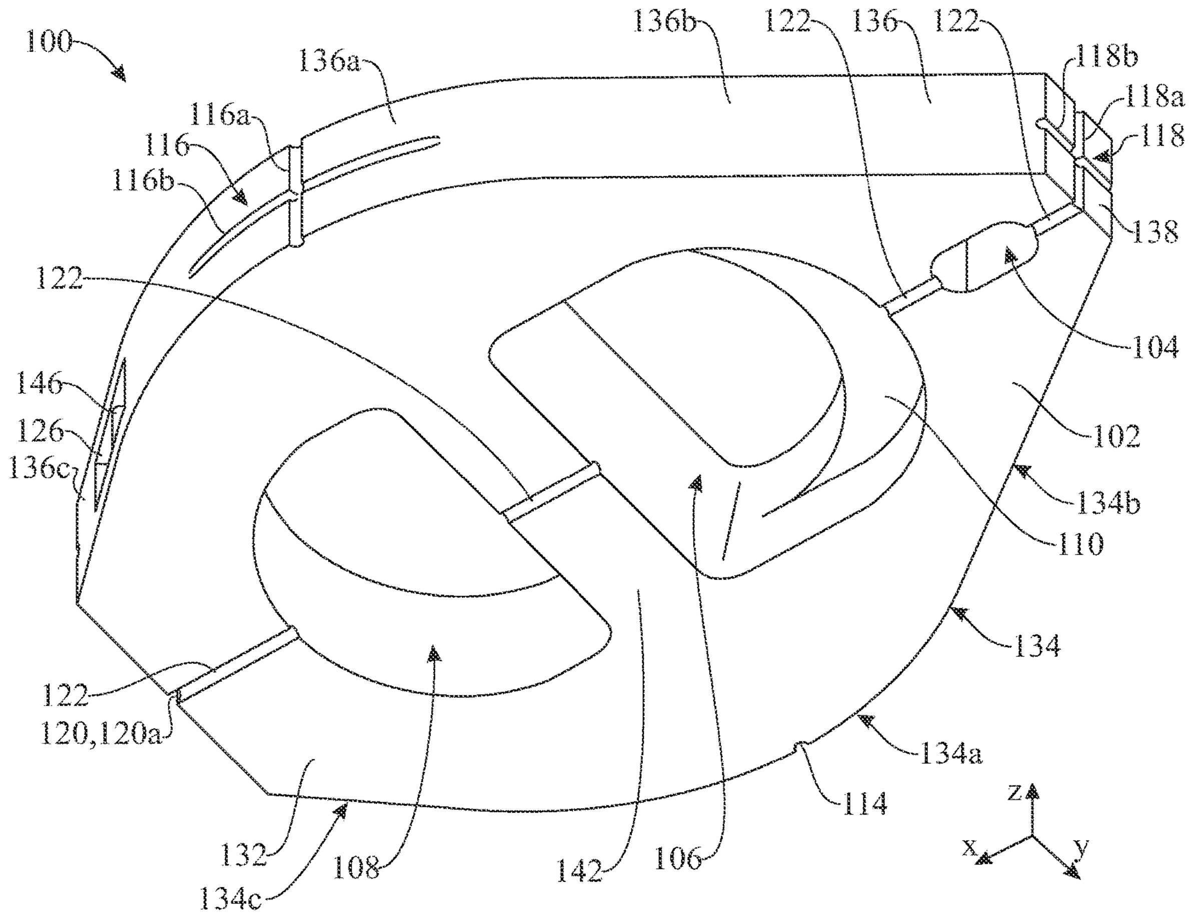
Figure 3:
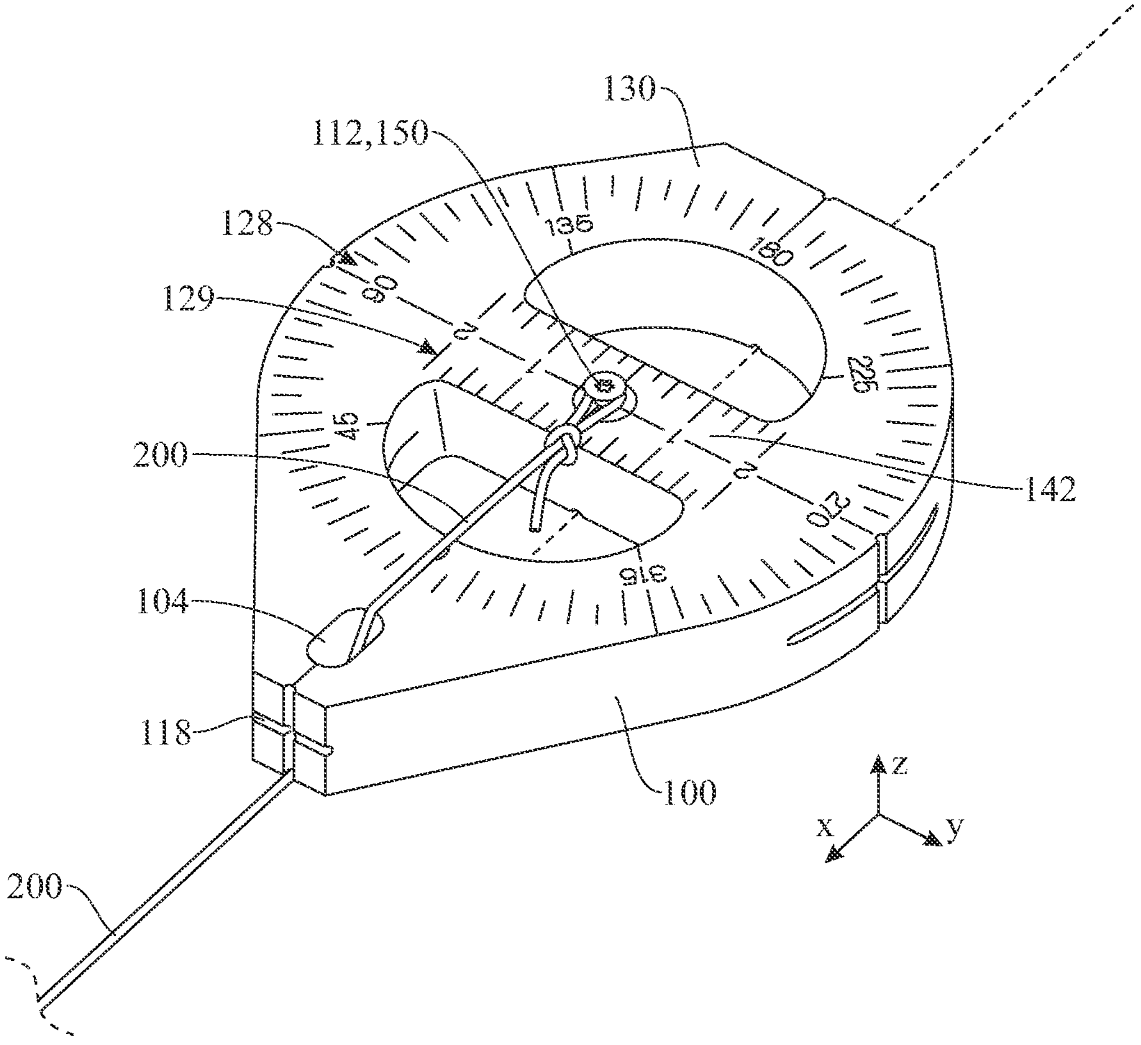
Figure 4:
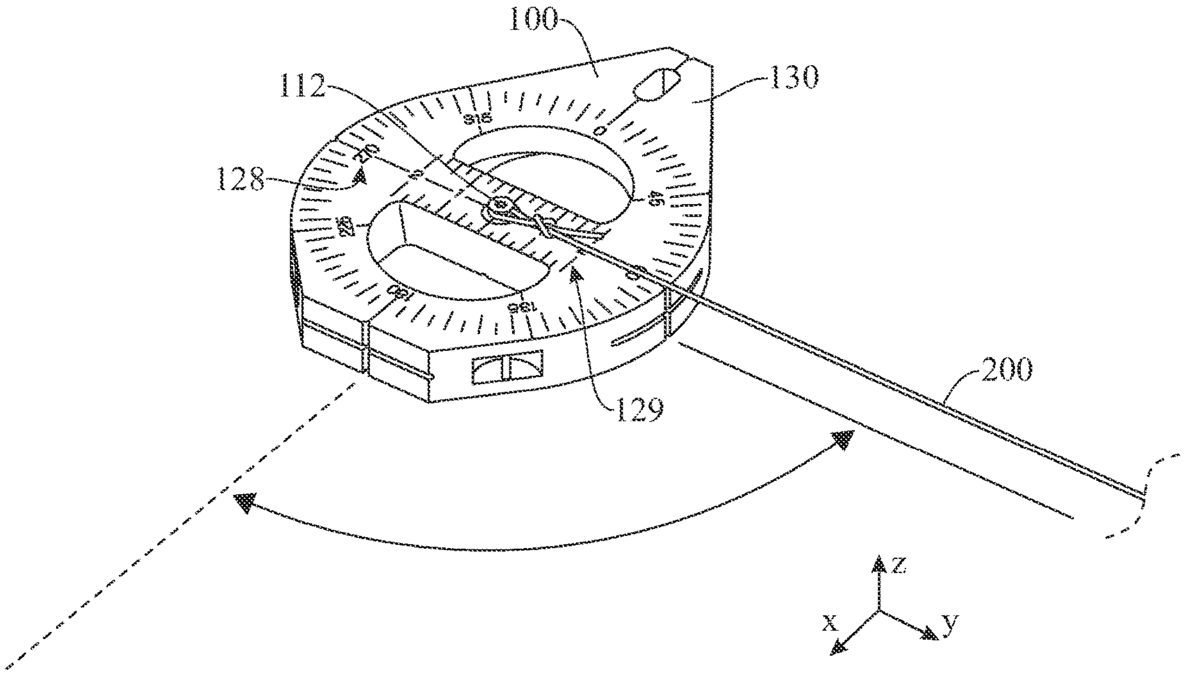
Figure 5:
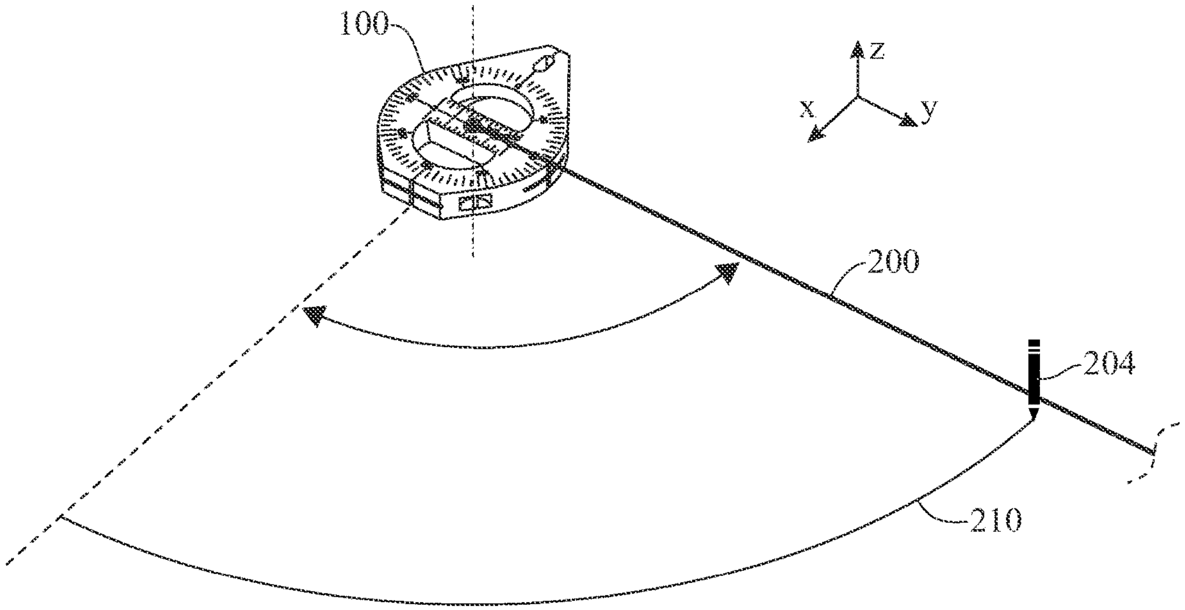
Figure 6:
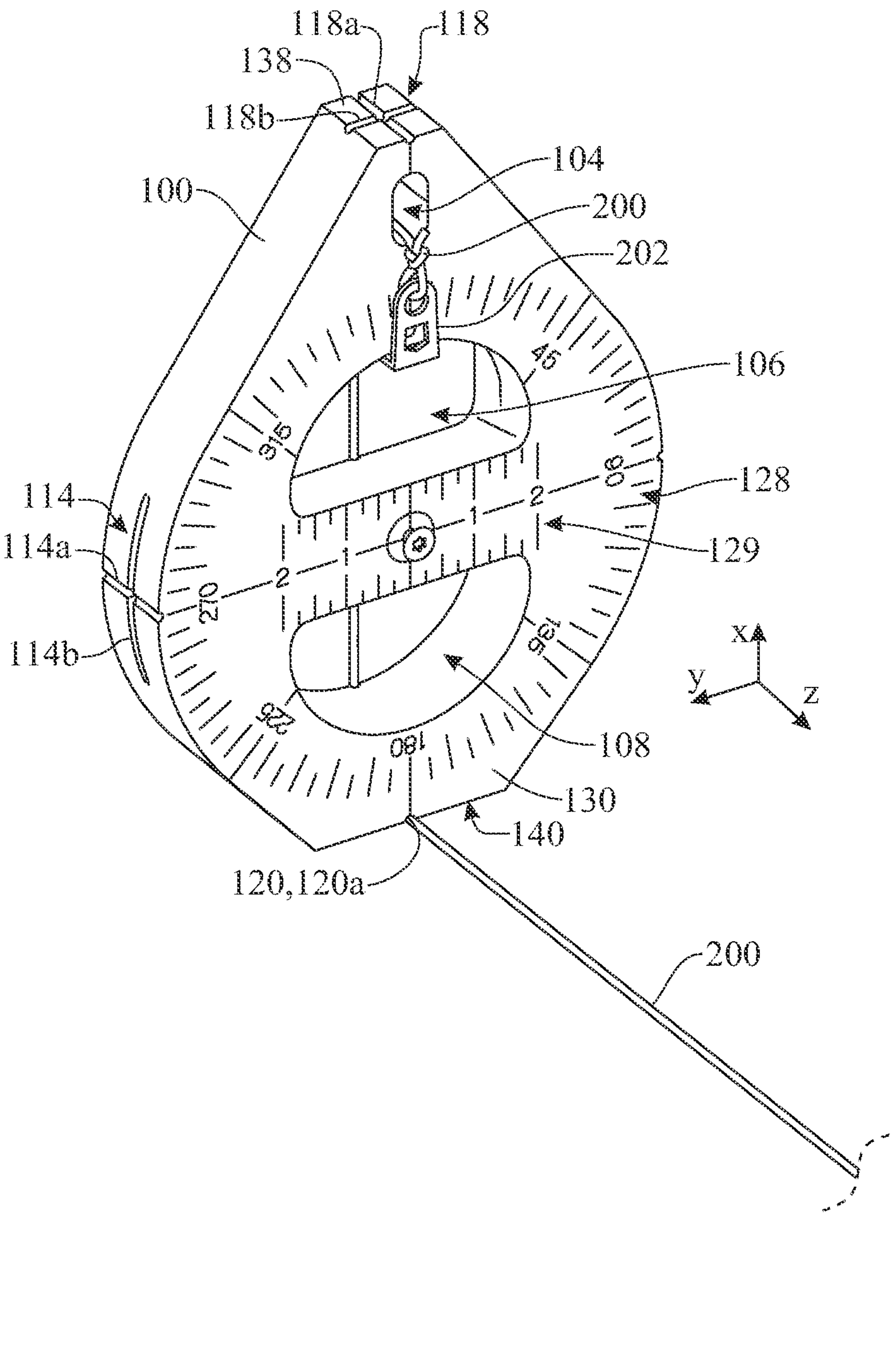
Figure 7:
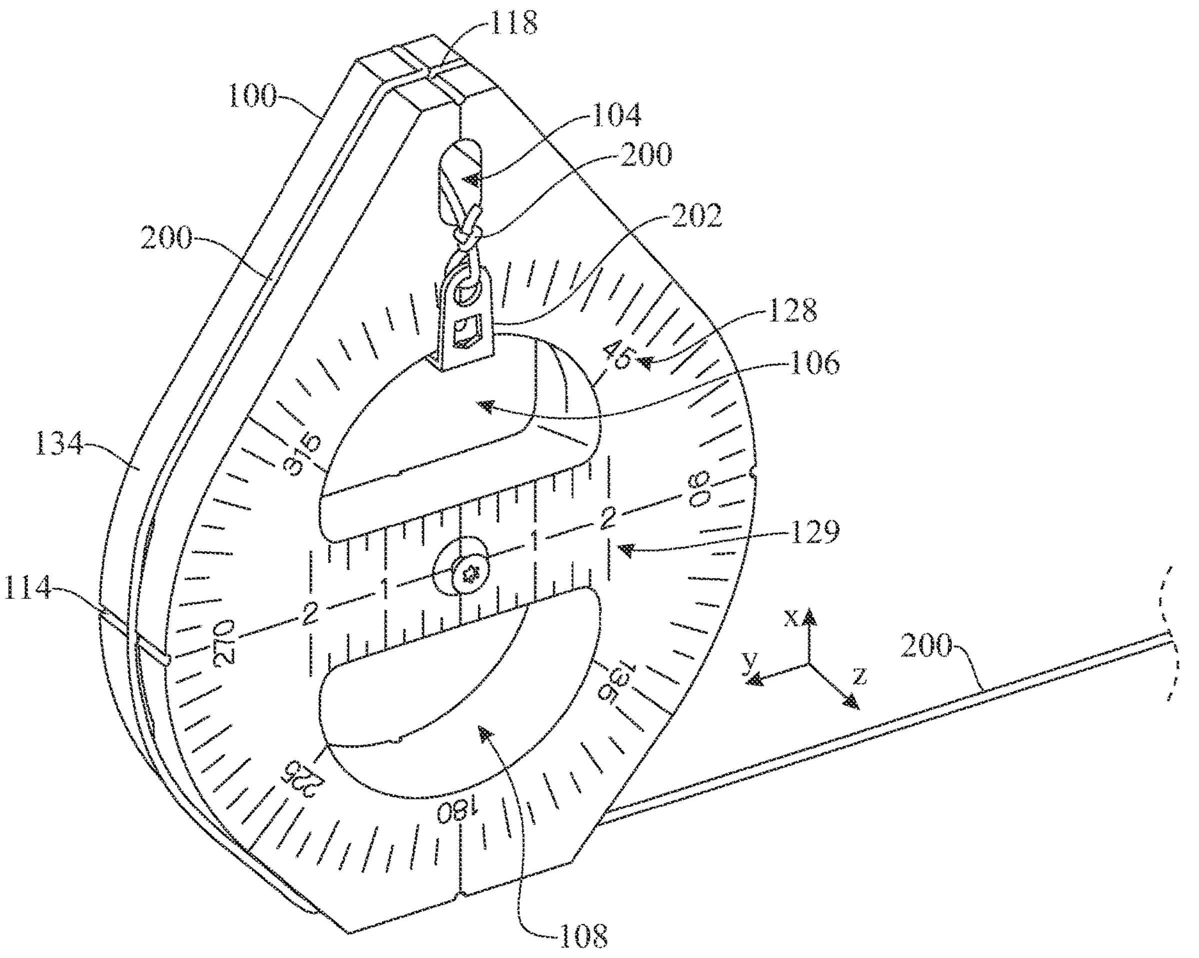
Figure 8:
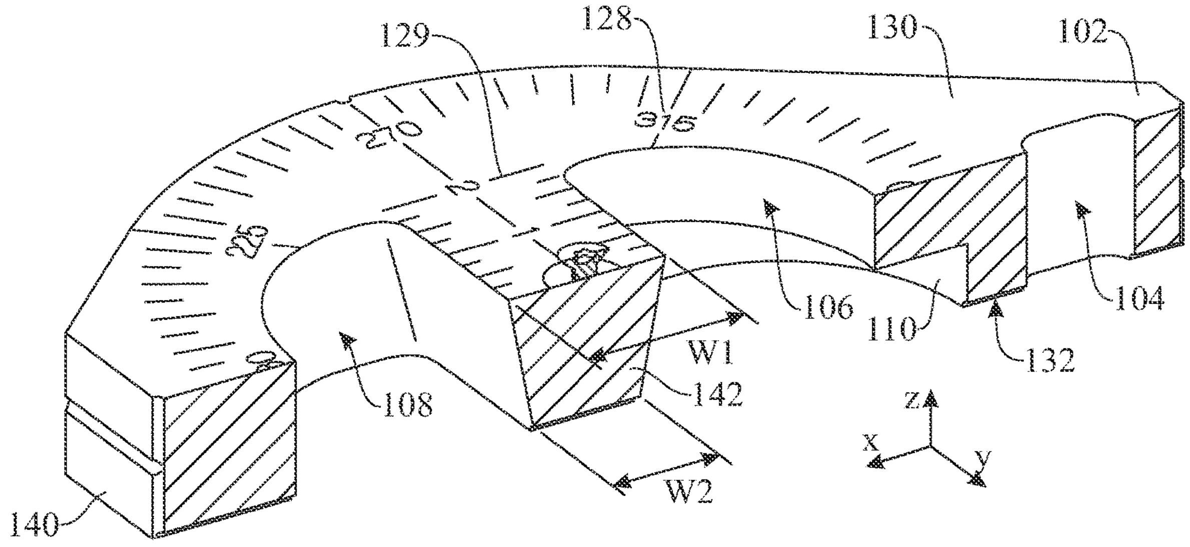
Figure 9:
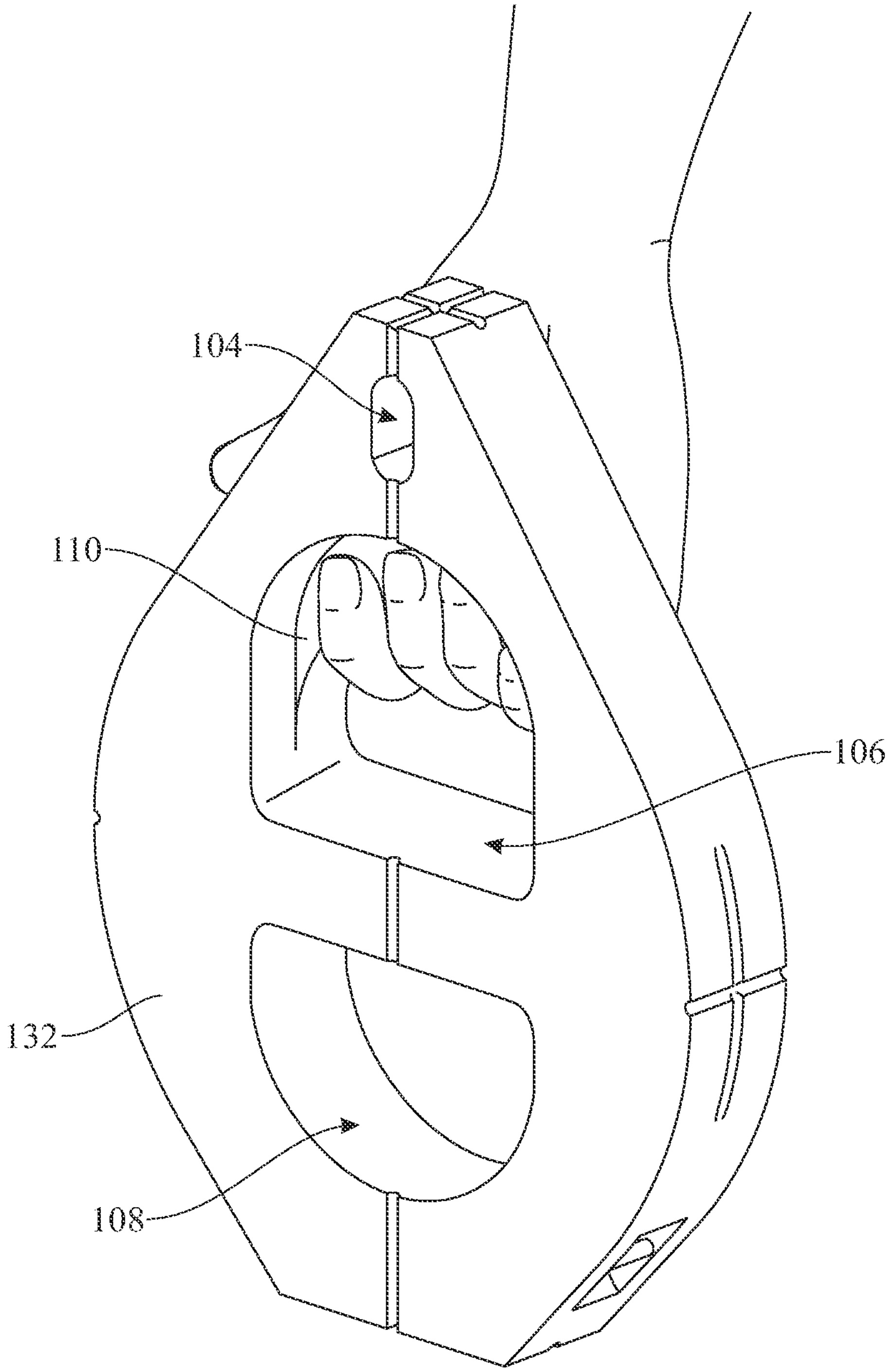

FIG. 1 presents a perspective view of a weighted chalk line device according to an embodiment of the present invention;

FIG. 2 presents another perspective view of a weighted chalk line device according to an embodiment of the present invention;

FIG. 3 presents a perspective view showing that a string is tied on a weighted chalk line device according to an embodiment of the present invention;

FIG. 4 presents another perspective view showing that a string is tied on a weighted chalk line device according to an embodiment of the present invention;

FIG. 5 presents a perspective view showing that a weighted chalk line device according to an embodiment of the present invention is used to draw chalk lines;

FIG. 6 presents a perspective view showing that a string is hooked on a weighted chalk line device according to an embodiment of the present invention;

FIG. 7 presents another perspective view showing that a string is hooked on a weighted chalk line device according to an embodiment of the present invention;

FIG. 8 presents a cross-sectional view of a weighted chalk line device according to an embodiment of the present invention; and FIG. 9 presents a perspective view showing that a weighted chalk line device according to an embodiment of the present invention is held by a user.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

Shown throughout the figures, the present invention may be directed toward a weighted chalk line device 100 for drawing chalk lines such as radiuses and circles for instance in new buildings. For example, these chalk lines may help the construction know where studs should be put down. Normally, this task may require two people to lay out a chalk line; however, the weighted chalk line device 100 of the present disclosure may allow one person to do the same job.

As will described in greater detail hereinafter, a user may hook a string 200 (FIG. 3) on the weighted chalk line device 100 while moving the string 200 at any angle and in any direction.

With reference initially to FIGS. 1 and 2, according to an embodiment of the present invention, the weighted chalk line device 100 may comprise a main body 102. According to an embodiment of the present invention, the main body 102 may be weighted, or relatively heavy, to allow for enhanced stability and ease of operation; for instance, in a preferred embodiment, the main body 102 may weight about 12 pounds. According to an embodiment of the present invention, the main body 102 may include a top side or surface 130 and a bottom side or surface 132 arranged generally opposite one another, as shown. In some embodiments, the bottom surface 132 may be generally flat and configured to stably rest on a generally flat surface. In some embodiments, the top surface 130 may also be generally flat; for instance, the top surface 130 and the bottom surface 132 of the present embodiment are generally flat, and parallel to one another, and the main body 102 is formed as a generally planar piece, i.e. as a piece having a generally constant height, i.e. a constant dimension in a top-to-bottom or vertical direction z measured from the bottom surface 132 to the top surface 130. In some embodiments, the bottom surface 132 may be coated with a slip resistance liner, or non-slip material, configured to provide an enhanced friction with a flat surface on which the bottom surface 132 may rest.

The main body 102 may further include a left side surface or first lateral surface 134 and a right side surface or second lateral surface 136 at opposite left and right sides of the main body 102, the left and right sides opposite to one another along a left-to-right, transverse direction y perpendicular to the vertical direction z. The first and second lateral surfaces 134 and 136 may each extend between the top and bottom surfaces 130 and 132 of the main body 102. The first and second lateral surfaces 134 and 136 may be arranged in lateral or transverse opposition with respect to one another. In some embodiments, such as the present embodiment, the first and second lateral surfaces 134 and 136 may be generally perpendicular to the top and bottom surfaces 130 and 132. In some embodiments, the first and second lateral surfaces 134 and 136 may be formed outwardly curved, or convexly curved or curving away from one another, as shown. More specifically, a central portion of each one of the first and second lateral surfaces 134 and 136 may be arcuately or circularly formed, while opposite ends of each one of the first and second lateral surfaces 134 and 136 may be generally straight; for example, with respect to the present drawings, the first lateral surface 134 includes a circular or arcuate central portion **134*a* and two generally flat and straight end portions 1346 and 134*c* extending from opposite ends of the central portion 134; similarly, the second lateral surface 136 includes a circular or arcuate central portion 136*a* and two generally flat and straight end portions 136*b* and 136*c* extending from opposite ends of the central portion 136. The rear, flat end portions 134*a* and 136*a* of the first and second lateral surfaces 134 and 136 may extend towards one another in a V-shaped arrangement, defining a tapered, rear end of the main body 102. Similarly, the front, flat end portions 134*b* and 136*b* of the first and second lateral surfaces 134 and 136 may extend towards one another in a V-shaped arrangement, defining a tapered, front end of the main body 102. The tapered, front and rear ends of the main body 102** are arranged opposite to one another along a front-to-back or longitudinal direction x, which is perpendicular to the transverse and vertical directions y and z.

A front side or third lateral surface 138 and a rear side or fourth lateral surface 140 may extend between the top and bottom surfaces 130 and 132 in longitudinal opposition with respect to one another. The third lateral surface 138 and fourth lateral surface 140 may be generally perpendicular to the top and bottom surfaces 130 and 132. In some embodiments, the third and fourth lateral surfaces 138 and 140 may be generally flat, and more preferably, generally parallel to one another and arranged at respective transverse planes, as shown. The third lateral surface 138 may truncate the tapered, front end of the main body 102, while the fourth lateral surface 140 may truncate the tapered, rear end of the main body 102.

The main body 102 may be generally elongated in the longitudinal direction x, as shown. For instance, a non-limiting embodiment of the main body 102, shown in the drawings, may have a length or dimension in the longitudinal direction x of about 10 inches, a width or dimension in the transverse direction y of about 8 inches, and a height or dimension along the vertical direction z of about 1 inch. In some embodiments, such as the present embodiment, the main body 102 may have a substantial teardrop shape. In some embodiments, the teardrop shape may be truncated at the front and rear ends thereof, as heretofore described.

With continued reference to FIGS. 1 and 2, a first through hole 104, a second through hole 106, and a third through hole 108 may extend through the main body 102 and may each be configured to allow the string 200 to pass therethrough. The first through hole 104 may traverse through the main body 102 from the top surface 130 to the bottom surface 132. As shown, the first through hole 104 may be located adjacent to the third lateral surface 138. In some embodiments, such as the present embodiment, the first through hole 104 may have an elongated and rounded-ended shape, such as an elliptical shape, as shown, the first through hole 104 elongately formed along the front-to-back, longitudinal direction x.

The third through hole 108 may be located adjacent to the fourth lateral surface 140. The second through hole 106 may be located between the first through hole 104 and the third through hole 108. For example, in the depicted embodiment, the first, second and third through holes 104, 106 and 108 are consecutively arranged or aligned in the front-to-back, longitudinal direction x, in spaced-apart relationship with one another. The second through hole 106 may traverse through the main body 102 from the top surface 130 to the bottom surface 132. Alternatively or, preferably, additionally, the third through hole 108 may traverse through the main body 102 from the top surface 130 to the bottom surface 132.

In some embodiments, the second through hole 106 and/or the third through hole 108 may each have a generally semi-circular shape. For instance, in the present embodiment, both the second through hole 106 and the third through hole 108 are generally semicircular and arranged symmetrically with respect to one another such that second and third through holes 106 and 108 jointly provide a circle-resembling outer periphery or contour.

The main body 102 may include a center bar 142. The center bar 142 may be formed between the second through hole 106 and the third through hole 108; i.e., the second and third through holes 106 and 108 may be arranged at and defined by opposite front and rear sides of the center bar 142, with the second through hole 106 arranged frontward of the center bar 142 and the third through hole 108 arranged rearward of the of the center bar 142, as shown. In some embodiments, the center bar 142 may have a generally rectangular shape. Embodiments are contemplated in which the center bar 142 may be tapered from the top surface 130 to the bottom surface 132, so as to help hand grip; for example, as shown in FIG. 8, the center bar 142 of the present embodiment is tapered from the from surface 130, at which the center bar has a first width W1, to the second surface 132, at which the center bar 142 has a second width W2 less than the first width W2.

The weighted chalk line device 100 may further include an indentation 110. The indentation 110 may traverse into the bottom surface 132. In some embodiments, the indentation 110 may be in spatial communication with the second through hole 106. In some embodiments, the indentation 110 may have a semi-circle shape. Preferably, the indentation 110 is arranged along an area of the second through hole 106 adjacent to the front end of the main body 102, i.e. adjacent to the first through hole 104.

Referring to FIG. 1, the weighted chalk line device 100 may include an anchor 112. The anchor 112 may be configured to allow the string 200 to be tied thereon, or to allow a measure tape to be hooked thereon, so as to set lay points with the chalk line. The anchor 112 may be formed on or provided at the top surface 130. The anchor 112 may be connected with or affixed to the center bar 142. In some embodiments, the anchor 112 may be located at a center point of the center bar 142. In some embodiments, the anchor 112 may be a flat screw head.

As shown in FIGS. 1 and 2, the weighted chalk line device 100 may include a first cross groove 114, a second cross groove 116, a third cross groove 118, and a fourth cross groove 120, each of which may be configured to receive the string 200. In some embodiments, the first cross groove 114 and the second cross groove 116 may be located opposite to each other. Similarly, the third cross groove 118 and the fourth cross groove 120 may be located opposite to each other.

With reference to FIG. 1, in some embodiments, the first cross groove 114 may traverse into the first lateral surface 134 at the left side of the main body 102. The first cross groove 114 may include first and second groove portions 114*a* and 114*b* intersecting one another at a generally 90-degree angle. The first groove portion 114*a* may be generally straight and extend in the vertical direction z. In some embodiments, the first groove portion 114*a* may traverse through the main body 102 from the top surface 130 to the bottom surface 132. In turn, the second groove portion 114*b* may be arranged along a horizontal or x-y plane generally perpendicular to the vertical direction z. In the present embodiment, the second groove portion 114*b* is arcuately formed along the arcuate and convex, central portion 134*a* of the first lateral surface 134.

With reference to FIG. 2, the second cross groove 116 may traverse into the second lateral surface 136 at the right side of the main body 102. The second cross groove 116 may include first and second groove portions 116*a* and 116*b* intersecting one another at a generally 90-degree angle. The first groove portion 116*a* may be generally straight and extend in the vertical direction z. In some embodiments, the first groove portion 116*a* may traverse through the main body 102 from the top surface 130 to the bottom surface 132. In turn, the second groove portion 116*b* may be arranged along a horizontal or x-y plane generally perpendicular to the vertical direction z, and preferably coplanar with the second groove portion 114*b* of the first cross groove 114 (FIG. 1). In the present embodiment, the second groove portion 116*b* is arcuately formed along the arcuate and convex, central portion 136*a* of the second lateral surface 136.

With continued reference to FIG. 2, the third cross groove 118 may traverse into the third lateral surface 138 at the front end of the main body 102. The third cross groove 118 may include first and second groove portions 118*a* and 118*b* intersecting one another at a generally 90-degree angle. The first groove portion 118*a* may be generally straight and extend in the vertical direction z. In some embodiments, the first groove portion 118*a* may traverse through the main body 102 from the top surface 130 to the bottom surface 132. In turn, the second groove portion 118*b* may extend in the transverse direction y, and is preferably coplanar with the second groove portions 114*b* and 116*b* of the first and second cross grooves 114 (FIG. 1) and 116. In the present embodiment, the second groove portion 118*b* is generally straight and extends along the vertical and transverse (or y-z), front or third lateral surface 138.

Referring back to FIG. 1, the fourth cross groove 120 may traverse into the fourth lateral surface 140 at the rear end of the main body 102. The fourth cross groove 120 may include first and second groove portions 120*a* and 120*b* intersecting one another at a generally 90-degree angle. The first groove portion 120*a* may be generally straight and extend in the vertical direction z. In some embodiments, the first groove portion 120*a* may traverse through the main body 102 from the top surface 130 to the bottom surface 132. In turn, the second groove portion 120*b* may extend in the transverse direction y, and is preferably coplanar with the second groove portions 1146, 116*b* and 118*b* of the first, second and third cross grooves 114, 116 and 118 (FIG. 2). In the present embodiment, the second groove portion 120*b* is generally straight and extends along the vertical and transverse (or y-z), rear or fourth lateral surface 140.

As shown in FIG. 2, the weighted chalk line device 100 may include a linear groove 122. The linear groove 122 may traverse into the bottom surface 132. In some embodiments, the linear groove 122 may be centrally positioned on the bottom surface 132. Preferably, as shown, the linear groove 122 extends in the front-to-back, longitudinal direction x. The linear groove 122 may extend from the third lateral surface 138 to the fourth lateral surface 140. The linear groove 122 may be in spatial communication with the first through hole 104, the second through hole 106, the third through hole 108, the indentation 110, the first groove portion 118*a* of the third cross groove 118 and the first groove portion 120*a* of the fourth cross groove 120. The linear groove 122 may be configured to receive and direct the string 200 therealong.

Referring to FIGS. 1 and 2, the weighted chalk line device 100 may include a first recess 124 and a second recess 126. The first recess 124 and the second recess 126 each may be configured to accommodate the string 200 or a safety lanyard while the first pin 144 and the second pin 146 each may be configured to allow the string 200 or a safety lanyard to be tied thereon. The first recess 124 may traverse into the first lateral surface 134. The first recess 124 may be located between the first cross groove 114 and the fourth cross groove 120. The second recess 126 may traverse into the second lateral surface 136. The second recess 126 may be located between the second cross groove 116 and the fourth cross groove 120. In some embodiments, the first recess 124 and the second recess 126 may be located opposite each other. For example, the first and second recesses 124 and 126 of the present embodiment are located at the second end portions 134*c* and 136*c* of the first and second lateral surfaces 134 and 136, respectively.

As further shown, the weighted chalk line device 100 may include a first pin 144 (FIG. 1) and a second pin 146 (FIG. 2). In some embodiments, the first pin 144 may be accommodated within the first recess 124. The first pin 144 may extend in the vertical direction z. The first pin 144 may be a spring pin. The second pin 146 may be accommodated within the second recess 126. The second pin 146 may extend in the vertical direction z. The second pin 146 may be a spring pin.

As shown in FIG. 1, the weighted chalk line device 100 may include a plurality of angular markings 128 to indicate an angular position with respect to a center or central point 150.

In preferred embodiments, the aforementioned anchor 112 is located at, or defines, the central point 150. In some embodiments, the plurality of angular markings 128 may be formed on and distributed over the top surface 130. The plurality of angular markings 128 may surround the second through hole 106 and the third through hole 108. As shown, the plurality of angular markings 128 may extend about and preferably concentric (about central point 150) with the circle-resembling outer periphery or contour defined by the adjacent, generally semicircular second and third through holes 106 and 108. The plurality of angular markings 128 may include a plurality of lines extending radially with respect to the central point 150, as shown. In some embodiments, the plurality of angular markings 128 may indicate angular positions ranging a full circumference (e.g., from 0 to about 360-degree angles), with major 45-degree intervals (0, 45, 90, 135, 180, 225, 270, and 315 degrees) indicated with longer markings or lines than intermediate angles and/or indicated with readable information (e.g. numbers), as shown. The 0-degree and the 180-degree angular markings 128 may be aligned with one another in the longitudinal direction x, and may be respectively oriented towards the first through hole 104 and the fourth cross groove 120. The 90-degree and the 270-degree angular markings 128 may be aligned with one another along the left-to-right or transverse direction y and may be respectively oriented towards the second cross groove 116 and the first cross groove 114. In preferred embodiments, the 0-, 90-, 180- and 270-degree markings may be aligned with the respective first groove portion 118*a*, 116*a*, 120*a* and 114*a* of the third, second, fourth, and first cross grooves 118, 116, 120 and 114, as shown in FIGS. 1 and 2 such that the 0-degree marking indicates an angular position of the first groove portion 118*a* of the third cross groove 118, the 90-degree marking indicates an angular position of the first groove portion 116*a* of the second cross groove 116, the 180-degree marking indicates an angular position of the first groove portion 120*a* of the fourth cross groove 120, and the 270-degree marking indicates an angular position of the first groove portion 114*a* of the first cross groove 114. In preferred embodiments, the 0, 90, 180, and 270 degree angular markings 128 extend to the respective first groove portion 118*a*, 116*a*, 120*a* and 114*a*.

As further shown in FIG. 1, in some embodiments, the weighted chalk line device 100 may include a plurality of linear markings 129 providing linear measurement information or indications. The plurality of linear markings 129 may be distributed over the center bar 142. Preferably, each linear marking of the plurality of linear markings 129 may indicate a respective distance from a common reference point; for example, in the present embodiment, the common reference point is located at the central point 150. The common reference point, or central point 150 in this embodiment, constitutes or provides a 0-distance or 0-scale measurement.

Operation of the weighted chalk line device 100 is now described with reference primarily to FIGS. 3-7 and 9. Turning initially to FIG. 9, a user may hold the main body 102 by extending his or her fingers into the first or second through holes 106, 108, facilitating transportation of the weighted chalk line device 100. In some embodiments, as shown, the indentation 110 may provide a relatively shallower or recessed seating surface for the fingers to wrap around and rest on, increasing user comfort while grasping the device.

Turning to FIG. 3, in a further example of operation of the weighted chalk line device 100, the operator may tie or otherwise secure the string 200 to the anchor 112 and extend the string 200 longitudinally frontward, across the top surface 130 of the main body 102, then vertically through the first through hole 104, further frontward along the linear groove 122 (FIG. 2) at the bottom surface 132 of the main body 102, and finally radially outward from the main body 102 with respect to the central point 150 defined by the anchor 112, and in an extended, taut condition. The string 200 is thus positioned extending radially outward at the 0-degree angular marking 128. At this point, the user may, for instance, choose to pluck the string 200 to create a chalk line below the string. In some applications, the bottom surface 132 may have been arranged to stably rest on a horizontal surface; in such cases, the weight of the weighted chalk line device 100 retains the string 200 in place beneath the main body 102 and anchors the end of the string 200 which is engaged to the main body 102 to the horizontal surface. The operator may then, without having to hold the main body 102 or said end of the string 200, pluck the string 200 as described or otherwise operate the string 200 without requiring another person to assist him or her. It should be noted that the string 200 may alternatively (or subsequently) positioned in different angular orientations, such as extending radially rearward at the 180-degree marking as indicated with dashed lines, to generate alternative or additional radial chalk lines.

In a different example of operation, and with reference to FIG. 4, the string 200 may instead be deployed from the anchor 112, over the top surface 130 of the main body 102 and radially outward from the main body 102, and extended to a taut condition. The weight of the main body 102 may immobilize the main body 102 and thus stabilize the anchor 112 (and thus the central point 150) in place as the user pulls on the far end of the string 200 to maintain the string 200 in taut condition. The user may then arrange the taut string 200 at different angular positions and pluck the string 200 to create one or more radial chalk lines or radiuses. For instance, as shown, the user may consecutively position the string 200 at the 0- and 90 degree markings to create two perpendicular chalk lines.

In a further example of use, shown in FIG. 5, the string 200 may be deployed from the anchor 112, over the top surface 130 of the main body 102 and radially outward from the main body 102 in spaced-apart relationship with the surface on which the bottom side 132 of the main body 102 rests on. The string 200 may be provided with a marking or writing utensil 204 arranged at a predetermined or selected distance from the anchor 112. The user may pull radially outward on the marking on writing utensil 204 to position the string 200 in an extended, taut condition. The weight of the main body 102 may once again immobilize the main body 102 and thus stabilize the anchor 112 (and therefore the central point 150) in place while the string 200 is extended in the taut condition. The user may then angularly displace the marking or writing utensil 204, allowing the marking or writing utensil 204 to mark, or draw, a circular line 210 which is circular by means of the opposite end of the string 200 being secured to the anchor 112, the anchor 112 in turn being secured to the surface by the weight of the weighted chalk line device 100, and the string 200 being non-stretchable. The angular markings 128 may guide the user in creating an arched line 210 of a specific or desired angular dimension; for example, in the depicted application, the user has translated the marking or writing utensil 204 and string 200 from the 0-degree marking to the 90-degree marking to form a 90-degree arc or one-fourth of a circle.

The illustrations of FIGS. 6 and 7 show alternative uses of the weighted chalk line device 100. In these examples, a hook 202 of the string 200 is releasably engaged with the main body 110, preferably at the indentation 110, to secure the string 200 to the main body 102. The string 200 is then extended through the first through hole 104, along the linear groove 122 (FIG. 2) at the bottom side 132 of the main body 102, and then outward of the main body 102 and further to a taut condition. For example, the illustration of FIG. 6 shows the main body 102 arranged in an upright position, with the rear or fourth lateral surface 140 resting on a horizontal surface. The string 200 is received within and extends along the first groove portion 120*a* of the fourth cross groove 200, and further extends outward from and perpendicular to the top side 130 of the main body 102, and is extended to a taut condition. In this position, the near end of the string 200 is secured in place, and the string 200 is allowed to remain taut, by the weight of the weighted chalk line device 100 resting on the string 200 and abutting the string 200 against the horizontal surface and/or retaining the string 200 between the fourth lateral surface 140 and the horizontal surface. With the string 200 secured and oriented in the desired orientation, the user may then pluck the taut string to form a chalk line in the horizontal surface. In the usage example of FIG. 7, instead, the string 200 is wrapped circumferentially around the main body 102, along and within the preferably coplanar second groove portions 114*b*, 116*b*, 118*b*, and 120*b* of the first, second, third and fourth cross grooves 114, 116, 118, and 120, respectively, and protrudes transversely outward of the main body 102 towards the right, and is extended to a taut condition. Similarly to FIG. 6, the string 200 is secured in place by the weight of the weighted chalk line device 100 resting on the string 200 and abutting the string 200 against the horizontal surface and/or retaining the string 200 between the fourth lateral surface 140 and the horizontal surface. With the string 200 secured and oriented in the desired orientation, the user may then pluck the string to form a chalk line on the horizontal surface.

A wide variety of further uses are enabled by selectively arranging the string 200 through the different through holes 104, 106, 108, cross grooves 114, 116, 118, 120, and linear groove 122, and by extending the string 200 from the main body 102 in any given direction x, y, z or combinations thereof. The anchor 112 may be configured to allow the string 200 to be tied thereon, or to allow a measure tape to be hooked thereon, so as to set lay points with the chalk line. The first recess 124 and the second recess 126 may selectively accommodate the string 200 or a safety lanyard while the first pin 144 and the second pin 146 allowing the string 200 or a safety lanyard to be tied thereon. In another example, a user may wrap the string 200 around the weighted chalk line device 100 to get to within a predetermined distance (1 inch, in the present embodiment) from a wall. As discussed, the weighted chalk line device 100 may hold a near end of the string 200 without tipping over when resting on the bottom surface 132 or the fourth lateral surface 140, allowing the user to maintain the string 200 in a taut condition while only having to pull on a far end or section of the string 200. The weighted chalk line device 100 may thus enable a single person to complete a layout without the need for a second person to hold the near end of the string 200.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A weighted chalk line device comprising:

a main body, three-dimensionally formed along a front-to-back, longitudinal direction, a left-to-right, transverse direction and top-to-bottom direction, said longitudinal, transverse and top-to-bottom directions perpendicular to each other, the main body comprising top and bottom sides arranged opposite to one another along the top-to-bottom direction, the bottom side configured to stably rest on a flat surface; and a plurality of angular markings, provided on the top side of the main body, the plurality of angular markings arranged at angularly-spaced-apart intervals from one another about a central point and providing a visible indication of a respective plurality of angular positions about the central point; wherein the weighted chalk line device is configured to adopt a first configuration, in which the main body is positioned on the flat surface with the bottom side of the main body stably resting on the flat surface, and a first end of a string is secured to the main body, and further in which the string is arranged extending from the main body in taut condition and radially outward from the central point, the string aligned with a selected angular marking of the plurality of angular markings such that the selected angular marking provides a visible indication of an angular position of the string about the central point, and further in which a weight of the weighted chalk line device maintains said first end of the string in a fixed position relative to the flat surface.

2. The weighted chalk line device of claim 1, the main body further comprising an anchor at the top side of the main body, the anchor defining said central point, and further wherein, in the first configuration of the weighted chalk line device, the first end of the string is secured to the anchor.

3. The weighted chalk line device of claim 1, wherein the bottom side of the main body is generally flat.

4. The weighted chalk line device of claim 3, wherein the top side of the main body is generally flat and parallel to the bottom side.

5. The weighted chalk line device of claim 4, wherein the plurality of angular markings extends along a 360-degree periphery of the central point.

6. The weighted chalk line device of claim 1, wherein the main body comprises a pair of through holes, each through hole of the pair of through holes extending through the main body from the top side to the bottom side, the pair of through holes arranged adjacent to and spaced-apart with one another by a central portion of the main body, wherein the central point is positioned at said central portion of the main body.

7. The weighted chalk line device of claim 6, wherein each through hole of the pair of through holes is generally semicircular and has a generally semicircular outer contour, wherein the generally semicircular outer contours of the pair of through holes are arranged extending away from one another such that said generally semicircular outer contours jointly define a generally circular outer contour of the pair of through holes, and further wherein the plurality of angular markings is concentric with said generally circular outer contour about said central point.

8. The weighted chalk line device of claim 6, wherein the pair of through holes are aligned with one another along the longitudinal direction of the main body.

9. The weighted chalk line device of claim 8, wherein the main body further comprises an additional through hole extending through the main body from the top side to the bottom side, the additional through hole arranged between a front end of the main body and the pair of through holes, the additional through hole arranged in spaced-apart and longitudinally-aligned relationship with the pair of through holes.

10. The weighted chalk line device of claim 9, wherein the additional through hole is elongately formed along the longitudinal direction.

11. The weighted chalk line device of claim 1, wherein the main body comprises a plurality of cross grooves formed along a periphery of the main body, the plurality of cross grooves arranged at angularly-spaced apart intervals from one another about the central point, wherein each cross groove of the plurality of cross grooves comprises a respective, first groove portion and a respective, second groove portion, the respective first groove portion arranged in the top-to-bottom direction and extending from the top side to the bottom side of the main body.

12. The weighted chalk line device of claim 11, wherein the respective, second groove portion of each cross groove is arranged generally parallel to the flat surface in the first configuration of the weighted chalk device.

13. The weighted chalk line device of claim 11, wherein the respective, second groove portion of each cross groove of the plurality of cross grooves is perpendicular to the respective, first groove portion of said each cross groove, and further wherein the second groove portions of the plurality of cross grooves are coplanar.

14. The weighted chalk line device of claim 11, wherein the main body comprises first and second lateral surfaces arranged at a left side and a right side of the main body, respectively, the left and right sides arranged opposite to one another along the transverse direction, the first and second lateral surfaces comprising a first cross groove and a second cross groove of the plurality of cross grooves, respectively, wherein the first groove portions of the first cross groove and the second cross groove are arranged at diametrically opposite, first and second angular markings of the plurality of angular markings, respectively.

15. The weighted chalk line device of claim 14, wherein the main body comprises a front end and a rear end arranged opposite to one another along the longitudinal direction of the main body, the main body further comprising a front surface and a rear surface arranged at the front and rear ends of the main body, respectively, the front and rear surfaces comprising a third cross groove and a fourth cross groove of the plurality of cross grooves, respectively, wherein the first groove portions of the third cross groove and the fourth cross groove are arranged at diametrically opposite, third and fourth angular markings of the plurality of angular markings, respectively.

16. The weighted chalk line device of claim 15, wherein the first, second, third and fourth angular markings of the plurality of angular markings are arranged at 90-degree intervals with respect to one another.

17. The weighted chalk line device of claim 15, further comprising a rectilinear groove recessed into the bottom surface of the main body along the longitudinal direction, the rectilinear groove extending to the first groove portions of the third and fourth cross grooves.

18. The weighted chalk line device of claim 1, wherein: the main body further comprises a front end and a rear end arranged opposite to one another along the longitudinal direction of the main body, the main body further comprising a generally planar, rear surface arranged at the rear end of the main body, the rear surface configured to stably rest on the flat surface alternatively to the bottom side; wherein in the first configuration of the weighted chalk line device, the plurality of angular markings is arranged in a first orientation with respect to the flat surface; and further wherein the weighted chalk line device is configured to alternatively adopt a second configuration, in which the main body is positioned on the flat surface with the rear surface of the main body stably resting on the flat surface, the plurality of angular markings arranged in a second orientation with respect to the flat surface, the second orientation different to the first orientation, and the first end of the string is secured to the main body, and further in which the string is arranged extending outward in taut condition from the main body, and the weight of the weighted chalk line device maintains said first end of the string in a fixed position relative to the flat surface.

19. A weighted chalk line device comprising:

a main body, three-dimensionally formed along a front-to-back, longitudinal direction, a left-to-right, transverse direction and top-to-bottom direction, said longitudinal, transverse and top-to-bottom directions perpendicular to each other, the main body comprising top and bottom sides arranged opposite to one another along the top-to-bottom direction, the bottom side configured to stably rest on a flat surface, the main body further comprising an anchor at the top side of the main body, the anchor defining a central point; and a plurality of angular markings, provided on the top side of the main body, the plurality of angular markings arranged at angularly-spaced-apart intervals from one another about the central point, along a 360-degree periphery of the central point, the plurality of angular markings providing a visible indication of a respective plurality of angular positions about the central point; wherein the weighted chalk line device is configured to adopt a first configuration, in which the main body is positioned on the flat surface with the bottom side of the main body stably resting on the flat surface, and a first end of a string is secured to the anchor, and further in which the string is arranged extending from the main body in taut condition and radially outward from the central point, the string aligned with a selected angular marking of the plurality of angular markings such that the selected angular marking provides a visible indication of an angular position of the string about the central point, and further in which a weight of the weighted chalk line device maintains said first end of the string in a fixed position relative to the flat surface.

20. A weighted chalk line device comprising:

a main body, three-dimensionally formed along a front-to-back, longitudinal direction, a left-to-right, transverse direction and top-to-bottom direction, said longitudinal, transverse and top-to-bottom directions perpendicular to each other, the main body comprising generally flat and parallel, top and bottom sides arranged opposite to one another along the top-to-bottom direction, the bottom side configured to stably rest on a flat surface, the main body further comprises a front end and a rear end arranged opposite to one another along the longitudinal direction, the main body further comprising a generally flat, rear surface arranged at the rear end of the main body, the rear surface generally perpendicular to the bottom side and configured to stably rest on the flat surface alternatively to the bottom side, the main body further comprising an anchor at the top side of the main body, the anchor defining a central point; and a plurality of angular markings, provided on the top side of the main body, the plurality of angular markings arranged at angularly-spaced-apart intervals from one another about the central point, along a 360-degree periphery of the central point, the plurality of angular markings providing a visible indication of a respective plurality of angular positions about the central point; wherein the weighted chalk line device is configured to selectively adopt:

a first configuration, in which the main body is positioned on the flat surface with the bottom side of the main body stably resting on the flat surface, the top side and the plurality of angular markings arranged generally parallel to the flat surface, and a first end of a string is secured to the anchor, and further in which the string is arranged extending from the main body in taut condition and radially outward from the central point, the string aligned with a selected angular marking of the plurality of angular markings such that the selected angular marking provides a visible indication of an angular position of the string about the central point, and further in which a weight of the weighted chalk line device maintains said first end of the string in a fixed position relative to the flat surface, and a second configuration, in which the main body is positioned on the flat surface with the rear surface of the main body stably resting on the flat surface, the top side and the plurality of angular markings arranged generally perpendicular to the flat surface, and the first end of the string is secured to the main body, and further in which the string is arranged extending outward in taut condition from the main body, and the weight of the weighted chalk line device maintains said first end of the string in a fixed position relative to the flat surface.

* * * * *